(12) United States Patent
Livingston

(10) Patent No.: US 6,317,140 B1
(45) Date of Patent: Nov. 13, 2001

(54) DISPLAYING INTERACTIVE BITMAP IMAGES WITHIN A DISPLAY SPACE

(75) Inventor: Kris R. Livingston, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/365,657

(22) Filed: Aug. 2, 1999

(51) Int. Cl.[7] .......................................... G09G 5/00

(52) U.S. Cl. ........................... 345/660; 345/667; 345/684

(58) Field of Search .................................... 345/123, 127, 345/128, 129, 660, 667, 670, 671, 684

(56) References Cited

U.S. PATENT DOCUMENTS

| | | | |
|---|---|---|---|
| 5,227,771 | * | 7/1993 | Kerr et al. ............................. 345/127 |
| 5,555,002 | * | 9/1996 | Nguyen ................................. 345/127 |
| 5,680,152 | * | 10/1997 | Bricklin ................................ 345/123 |
| 5,726,687 | * | 3/1998 | Belfiore et al. ...................... 345/123 |

* cited by examiner

*Primary Examiner*—Matthew Luu

(57) ABSTRACT

A bitmap image is displayed within a display area. The display area has a central region and an edge region. A portion of the bitmap is selected by positioning a moveable pointer in the central region over the portion of the bitmap to be selected. The portion of the bitmap is then displayed in the display area. The bitmap image is scrolled by positioning the moveable pointer in the edge region of the display area.

18 Claims, 3 Drawing Sheets

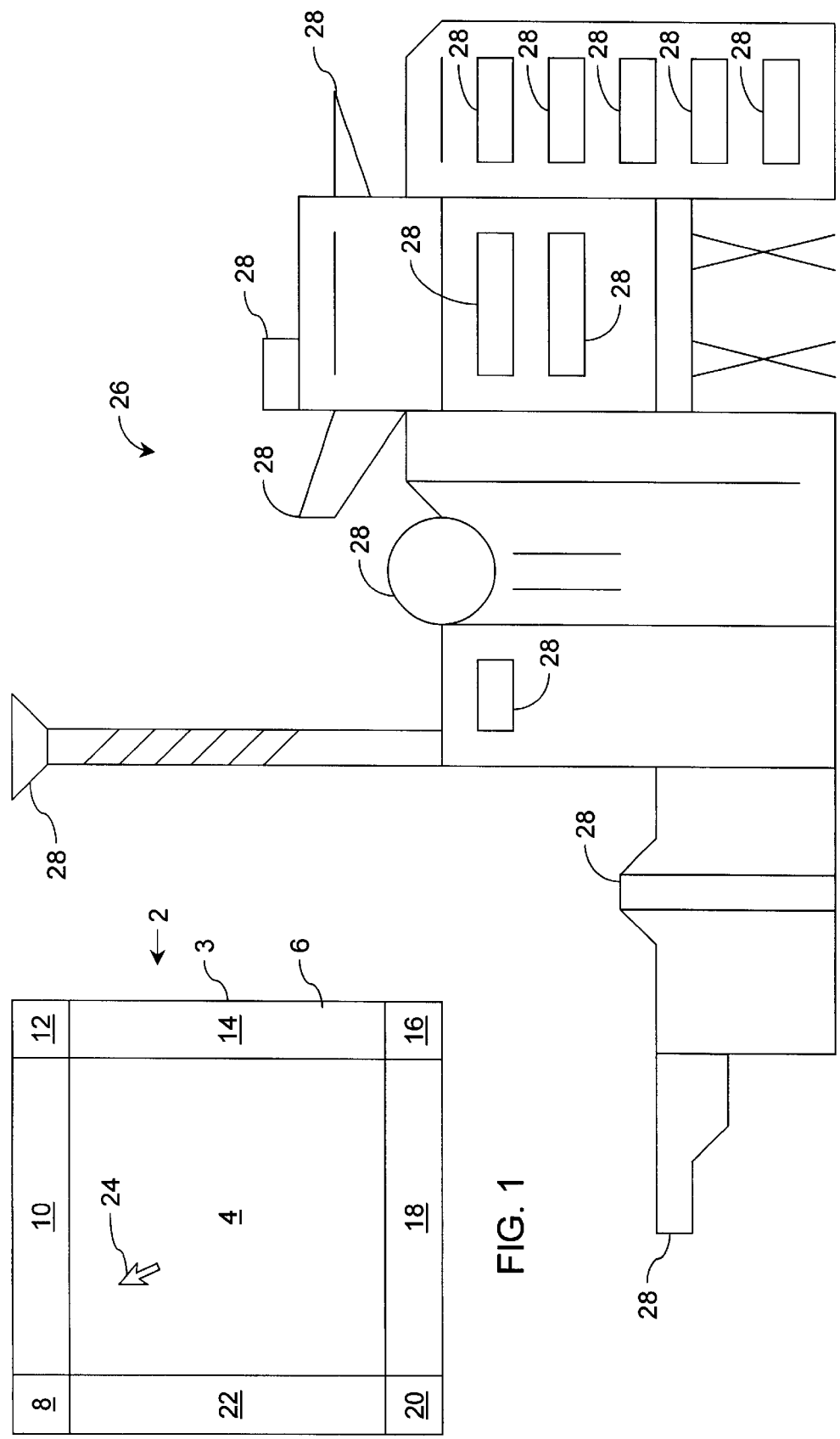

DISPLAYING INTERACTIVE BITMAP IMAGES WITHIN A DISPLAY SPACE

FIELD OF THE INVENTION

This invention relates in general to interactive bitmap images and, more particularly, to displaying interactive bitmap images in a display space.

BACKGROUND OF THE INVENTION

Interactive bitmap images are used for a variety of applications to provide an intuitive, interactive display for a user. Typically, a bitmap image is displayed in a window of a fixed size. Each of several portions of the image is interactive to allow a user to select or configurable settings.

For example, in the field of printers, various setting of a printer may be user configurable, such as the input trays and output bins. A bitmap image of the printer, including the input trays and output bins, is displayed. The image of the input trays and output bins are interactive. To interact with the bitmap image, a user places a moveable pointer or cursor over one of the interactive portions of the bitmap image and selects the interactive portion. Selecting the interactive portion is often accomplished by depressing a button on a computer "mouse". The selected portion is often highlighted to indicate it has been selected.

In order to provide an easy to use interface, the interactive elements of the bitmap image must be displayed at a sufficient size to allow a user to easily select among the various interactive portions of the bitmap image. When the area in which the interactive bitmap image is displayed is large, providing the image at a sufficient size is easily accomplished. However, when the size of the interactive bitmap image is large compared to the size of the display, it becomes more difficult to display the interactive portions of the interactive bitmap display at a sufficient size.

An interactive bitmap images may be given the flexibility to grow as new user configurable components are added to the system represented by the interactive bitmap image. This flexibility allows the interactive bitmap image to become very large. In printer technology, new interactive portions may be added to an interactive bitmap image in a printer driver when new user configurable components are added to a printer system.

Prior solutions for displaying large interactive bitmap images generally fall into three categories: scaling down, truncating, and scrolling. Scaling down is accomplished by displaying the interactive image at a small scale. This becomes less desirable as an interactive bitmap image becomes larger in comparison to the area in which it is to be displayed. As the bitmap image is displayed at smaller scales, the interactive portions of the bitmap image become smaller and more difficult to use.

Truncating involves excluding from the interactive bitmap image a subset of interactive portions of the interactive bitmap that appear outside of the boundaries of the display area. This solution is unsatisfactory since interactive portions of the interactive bitmap image that have been truncated can not be accessed. Those interactive portions of the interactive bitmap image that cannot be accessed are no longer interactive.

Scrolling as conventionally used with interactive bitmap images involves placing scroll bars at the perimeter of the display area of the image so that a user may scroll through an image that is displayed at a full scale. One disadvantage of this solution is that the entire image cannot be viewed at once. Additionally, the use of scroll bars to move about the image is cumbersome.

SUMMARY OF THE INVENTION

According to principles of the present invention, a bitmap image is displayed within a display area. The display area has a central region and an edge region. A portion of the bitmap is selected by positioning a moveable pointer in the central region over the portion of the bitmap to be selected. The portion of the bitmap is then displayed in the display area. The bitmap image is scrolled by positioning the moveable pointer in the edge region of the display area.

According to further principles of the present invention, the speed and direction of scrolling are determined by the location of the moveable pointer within the edge region.

Other objects, advantages, and capabilities of the present invention will become more apparent as the description proceeds.

DESCRIPTION OF THE DRAWINGS

FIG. 1 represents a display area of the present invention.

FIG. 2 is an example of an interactive bitmap image for use with the present invention.

DETAILED DESCRIPTION OF THE INVENTION

Figure 3:
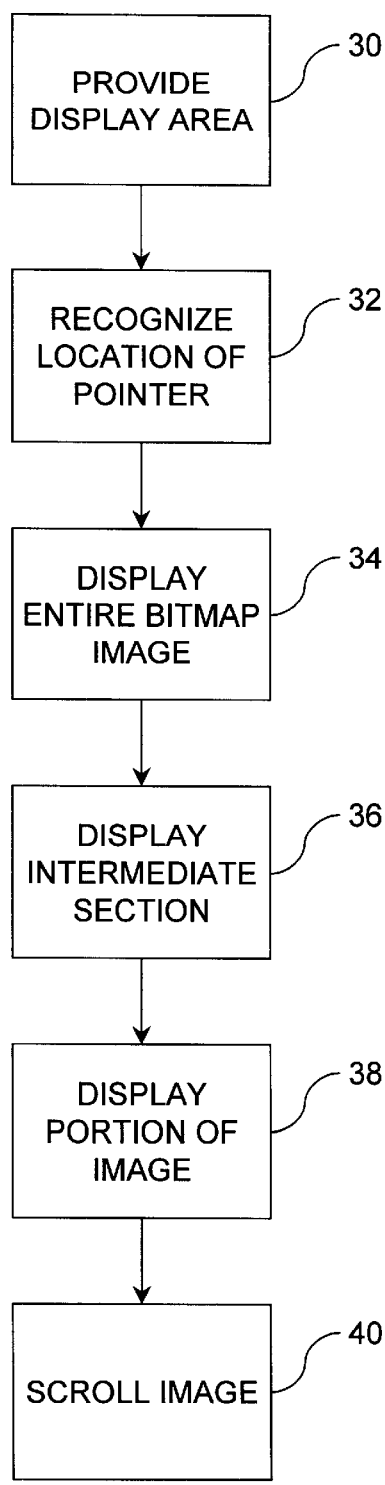
FIG. 3 is a flow chart illustrating one embodiment of the method of the present invention.

FIG. 1 represents a display area 2 bounded by a perimeter 3. Display area 2 may be any size or shape. Display area 2 is any type of visual display area such as appears on a printer driver window or on a peripheral device. Display area 2 includes a central region 4 and an edge region 6. Edge region 6 may be further divided in to upper left corner 8, upper side 10, upper right corner 12, right side 14, lower right corner 16, lower side 18, lower left corner 20, and left side 22.

Moveable within display area 2 is a pointer 24. Pointer 24 is shown as an arrow, however, pointer 24 may take any shape. Pointer 24 is also either moveable outside of display area 2 or deactivatable.

FIG. 2 represents an example of an interactive bitmap image 26. Interactive bitmap image 26 represents a device having user configurable elements. The user configurable elements are represented by interactive portions 28. In this example, interactive bitmap image represents a complex printer configuration with multiple paper input trays and output bins. In order to more easily illustrate the present invention, the printer configuration represented in FIG. 2 is extraordinarily complex and not a typical printer configuration.

FIG. 3 illustrates one method for practicing the present invention. Although FIG. 3 illustrates steps in a specific order, the present invention encompasses all variations of the steps, including simultaneous execution of the steps. A display area 2 is provided 30. Display area 2 may be provided by any means. For example, display area 2 may be provided on a computer screen or on a display screen of a device.

Pointer 24 is able to move relative to display area 2. As pointer 24 moves relative to display area 2, the location of pointer 24 is recognized 32.

Figure 4:
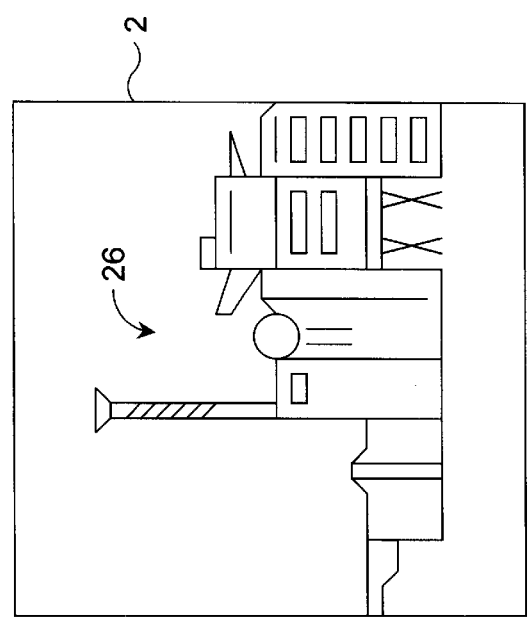
FIG. 4 shows the entire interactive bitmap image of FIG. 2 displayed within the display area of FIG. 1.

When pointer 24 is outside of display area 2 or is inactive, interactive bitmap image 26 is displayed 34 entirely within display area 2. FIG. 4 represents interactive bitmap image 26 displayed 34 within display area 2. If necessary, interactive bitmap image 26 is displayed 34 at a reduced scale in order to fit the entire image 26 within the boundaries of display area 2. Alternatively, bitmap image 26 may be displayed 34 at full scale or even enlarged as long as the entire bitmap image 26 is displayed 34 within display area 2.

When pointer 24 is within central region 4 of display area 2, a portion 42 of interactive bitmap 26 is displayed 38 in display area 2. The initial portion 42 of interactive bitmap 26 displayed 38 in display area 2 may be a default portion 42 or alternatively may be determined by the location of pointer 24 within display area 2. The portion 42 may be displayed at any scale. However, displaying portion 42 at full scale is often the most desirable.

In order to make it more clear to a user how the portion 42 relates to the entire bitmap, a "zooming" animation may be used. The zooming animation is accomplished by displaying 36 intermediate sections of bitmap 26 at successively greater scales than the previous display. For example, if the entire bitmap image 26 is displayed at a 40% scale, and portion 42 is displayed at 100% scale, intermediate sections may be displayed at 60% and 80% scales. The first display would be the entire bitmap image 26 at 40% scale, the second would be a section displayed at 60%, the third would be a section displayed at 80%, and the forth display would be portion 42 at 100%. Each intermediate section includes at least portion 42. In order to provide the greatest clarity to a user, portion 42 is centered in each section.

Figure 5:
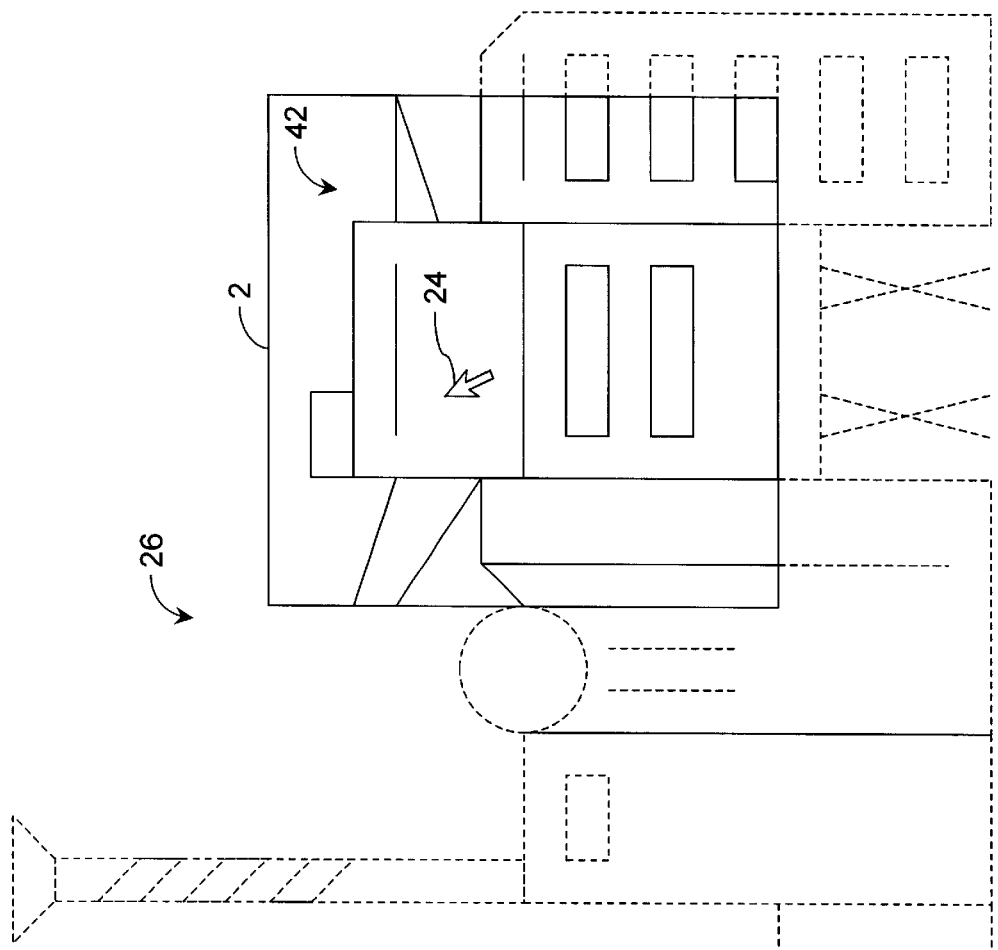
FIG. 5 shows a portion of the interactive bitmap image of FIG. 2 displayed within the display area of FIG. 1 and the remainder of the interactive bitmap image outside the display area.

FIG. 5 illustrates portion 42 displayed within display area 2. The remaining portions of bitmap image 26 are shown in dashed lines to indicate they are not displayed.

After displaying portion 42, bitmap image 26 may be scrolled 40 through display area 2. Scrolling 40 is accomplished by positioning the pointer 24 within the edge region 6 of display area 2. The direction of the scrolling 40 is controlled by the location of pointer 24 within edge region 6. For example, if pointer 24 is within left side 22, bitmap image 26 is scrolled to the right through display area 2 and if pointer 24 is within lower right corner 16, bitmap image 26 is scrolled up and to the left through display area 2.

In one embodiment, the speed at which bitmap image 26 scrolls through display area 2 is constant. In a second embodiment, the speed is controlled by the location of pointer 24 within edge region 6. In the second embodiment, the closer pointer 24 is to the outer boundary of display area 2, the faster bitmap image 26 is scrolled through display area 2.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for displaying an interactive bitmap image in a display area, the method comprising:
    (a) providing a display area defined by a perimeter, the display area having a central region and an edge region;
    (b) recognizing a location of a moveable pointer;
    (c) displaying in the display area, the entire bitmap image at a scale to fit within the display area;
    (d) responsive to recognizing the location of the moveable pointer within the display area, displaying within the display area, in place of the entire bitmap image, a portion of the bitmap image; and,
    (e) scrolling the bitmap image through the display area in a direction indicated by the location of the pointer within the edge region of the display area.

2. The method of claim 1 wherein displaying the entire bitmap image within the display area includes displaying the entire bitmap image at a reduced scale.

3. The method of claim 1 wherein displaying the portion of the bitmap image includes displaying the portion of the bitmap image at an enlarged scale.

4. The method of claim 1 wherein displaying the portion of the bitmap image includes displaying the portion of the bitmap image at full scale.

5. The method of claim 1 wherein scrolling the bitmap image includes scrolling the bitmap image at a rate determined by the location of the pointer within the edge region of the display area.

6. The method of claim 1 wherein displaying the portion of the bitmap image in the display area includes displaying after the entire bitmap image and before the portion of the bitmap, at least one intermediate section of the bitmap image, each intermediate section of the bitmap image including at least the portion of the bitmap image and each intermediate section of the bitmap image displayed at a scale greater than the scale of the previous display.

7. A system for displaying an interactive bitmap image in a display area, the system comprising:
    (a) a display area defined by a perimeter, the display area having a central region and an edge region;
    (b) a moveable pointer;
    (c) means for recognizing a location of the moveable pointer;
    (d) means for displaying in the display area, the entire bitmap image at a scale to fit within the display area;
    (e) means, responsive to recognizing the location of the moveable pointer within the display area, for displaying within the display area, in place of the entire bitmap image, a portion of the bitmap image; and,
    (f) means for scrolling the bitmap image through the display area in a direction indicated by the location of the pointer within the edge region of the display area.

8. The system of claim 7 wherein the means for displaying the entire bitmap image within the display area includes means for displaying the entire bitmap image at a reduced scale.

9. The system of claim 7 wherein the means for displaying the portion of the bitmap image includes means for displaying the portion of the bitmap image at an enlarged scale.

10. The system of claim 7 wherein the means for displaying the portion of the bitmap image includes means for displaying the portion of the bitmap image at full scale.

11. The system of claim 7 wherein the means for scrolling the bitmap image includes means for scrolling the bitmap image at a rate determined by the location of the pointer within the edge region of the display area.

12. The system of claim 7 wherein the means for displaying the portion of the bitmap image in the display area includes means for displaying after the entire bitmap image and before the portion of the bitmap, at least one intermediate section of the bitmap image, each intermediate section of the bitmap image including at least the portion of the bitmap image and each intermediate section of the bitmap image displayed at a scale greater than the scale of the previous display.

13. A program storage system readable by a computer, tangibly embodying a program, applet, or instructions executable by the computer to perform method steps for displaying an interactive bitmap image in a display area, the method steps comprising:
   (a) providing a display area defined by a perimeter, the display area having a central region and an edge region;
   (b) recognizing a location of a moveable pointer;
   (c) displaying in the display area, the entire bitmap image at a scale to fit within the display area;
   (d) responsive to recognizing the location of the moveable pointer within the display area, displaying within the display area, in place of the entire bitmap image, a portion of the bitmap image; and,
   (e) scrolling the bitmap image through the display area in a direction indicated by the location of the pointer within the edge region of the display area.

14. The program storage system of claim 13 wherein the method step of displaying the entire bitmap image within the display area includes displaying the entire bitmap image at a reduced scale.

15. The program storage system of claim 13 wherein the method step of displaying the portion of the bitmap image includes displaying the portion of the bitmap image at an enlarged scale.

16. The program storage system of claim 13 wherein the method step of displaying the portion of the bitmap image includes displaying the portion of the bitmap image at full scale.

17. The program storage system of claim 13 wherein the method step of scrolling the bitmap image includes scrolling the bitmap image at a rate determined by the location of the pointer within the edge region of the display area.

18. The program storage system of claim 13 wherein the method steps of displaying the portion of the bitmap image in the display area includes displaying after the entire bitmap image and before the portion of the bitmap, at least one intermediate section of the bitmap image, each intermediate section of the bitmap image including at least the portion of the bitmap image and each intermediate section of the bitmap image displayed at a scale greater than the scale of the previous display.

\* \* \* \* \*